UNITED STATES PATENT OFFICE.

OTTO HORSTMANN, OF COLOGNE, GERMANY.

COLD-INSULATING PLATE AND PROCESS OF OBTAINING THE SAME.

SPECIFICATION forming part of Letters Patent No. 674,969, dated May 28, 1901.

Application filed August 27, 1900. Serial No. 28,252. (No model.)

*To all whom it may concern:*

Be it known that I, OTTO HORSTMANN, a citizen of the German Empire, and a resident of Cologne, Rhine Province, Germany, have invented certain new and useful Improvements in Cold-Insulating Plates and Processes of Obtaining the Same; and I do hereby declare that the following is a full, clear, and exact description of the invention, which will enable others skilled in the art to which it appertains to make and use the same.

The present invention relates to an improved cold-insulating material—that is, a material preventing the access of heat to the objects or contrivances—such as refrigerators, surface coolers, refrigerating-tubes, or the like—on which the same has been applied in the form of plates or sheets. This material and the plates or sheets made of it possess the property of obtaining, by means of heat, such a plasticity as to be easily formed to any desired shape, said material receiving again its original solid consistency as soon as the same is cooled down.

Further, my invention relates also to a process for obtaining—that is, manufacturing—the improved cold-insulating material.

The new material, and consequently the plates or sheets formed with it, is composed of asphaltum, paraffin-oil, (a mixture of paraffin and mineral oil,) and comminuted or granulated cork. Said new material may be obtained by heating the well-known commercial tar-like product composed of asphaltum and paraffin-oil in a vessel to melt the mixture and then mixing the melted mass in a separate heated vessel with comminuted cork. The resulting product, after having been thoroughly stirred up during the heating, is then poured in an iron form, the inner surface of which is moistened with mineral oil. The form, which is preferably provided with parallel sides, possesses an inner height corresponding to the thickness of the plate or sheet to be obtained. Further, the mass contained in the form is spread out and pressed by means of a smooth roller moistened with mineral oil, said roller being moved along the top of the side walls of the form. In this way one obtains a plate of homogeneous consistency with parallel sides. Now the plate is thrown out of the form on a plane surface covered with cork-dust. Thereafter the plate cools down and is then a solid body, which can be packed up ready for sale.

Supposing that a tube, a tank, or any hollow contrivance is to be covered with the new material in order to be kept cool—that is, protected against the access of heat—a plate of the above-described kind is cut to the right size and heated in a steam heating apparatus. The plate is heated until the same is soft or plastic enough to be easily bent to the proper shape. Now the surface of the plate which shall come into contact with the tube, tank, or the like to be insulated is spread over with the above-named tar-like product composed of asphaltum and paraffin-oil, and then the plate is applied and fastened tightly on the said tube or the like in one or several layers. In order to fix the material or plate well on the tube or the like, said material or plate is wrapped or covered with a bandage of suitable material, whereafter the latter is painted or treated in the same manner as the usual insulating materials.

Having thus described my invention, what I claim, and desire to secure by Letters Patent, is—

1. As an article of manufacture a cold-insulating plate adapted to be formed to any desired shape after being heated and to become solid when the temperature of same is diminished said plate being composed of asphaltum, paraffin-oil, that is a mixture of paraffin and mineral oil, and comminuted cork, substantially as set forth.

2. A process for obtaining a cold-insulating plate adapted to be formed to any desired shape upon being heated and to become solid after the temperature of same is diminished consisting in melting by heat the commercial tar-like product composed of asphaltum and paraffin and a mineral oil, mixing the melted mass with comminuted cork, forming the resulting mass into a plate, and allowing said plate to obtain a solid consistency, substantially as set forth.

In witness whereof I have hereunto set my hand in presence of two witnesses.

OTTO HORSTMANN.

Witnesses:
CHARLES LE SIMPLE,
KARL SCHMETT.